June 20, 1944.                L. T. WILSON                2,352,056

THERMALLY CONTROLLED RESISTOR

Filed Sept. 23, 1942

INVENTOR
L.T. WILSON
BY
Walter C. Kiesel
ATTORNEY

Patented June 20, 1944

2,352,056

UNITED STATES PATENT OFFICE 2,352,056

THERMALLY CONTROLLED RESISTOR

Leon T. Wilson, Summit, N. J., assignor to Bell Telephone Laboratories, Incorporated, New York, N. Y., a corporation of New York Application September 23, 1942, Serial No. 459,371

6 Claims. (Cl. 201—63)

This invention relates to resistors and more particularly to resistors having a relatively high absolute value of resistance-temperature coefficient and to thermoelectric means for controlling the temperature of such resistors.

Devices, the resistance of which varies greatly with changes in temperature, have for convenience of terminology been called thermistors. Wherever the term "thermistor" may be used in this specification or the appended claims such a device is intended.

The temperature and thus the resistance of a thermistor may be controlled in several ways one of which is by means of electric heating. This may be done with a current carrying heater such as a coil of wire or a body of resistance material maintained in close proximity to the thermistor element. Such a device is known as an indirectly heated thermistor. The heating may also be done by means of current flowing directly through the thermistor element, as in the so-called directly heated thermistor. In either type of device, control is accomplished by heating the thermistor to a temperature above that which it would have if no heating current were flowing. Thus to vary the resistance to either side of a median value, it is necessary to increase or decrease the heating from that necessary to maintain a median resistance.

The "speed" of a thermistor is a function of its thermal inertia. A thermistor that can be heated and cooled rapidly is said to be a "high speed" thermistor. High speed may be obtained in the type of thermistor above described, by employing a thermistor element of low heat capacity for rapid heating, and by providing high thermal conductivity to a surrounding medium of large heat capacity for rapid cooling. In view of this high thermal conductivity, the sensitivity of the device is decreased. On the other hand, thermistors are often enclosed in an evacuated envelope or one containing a gas or other suitable atmosphere of small heat capacity and low thermal conductivity to increase their sensitivity. In a thermistor such as those previously described, the effect of an ambient atmosphere of this type is to reduce the rate of heat loss from the thermistor element, thereby somewhat decreasing its speed.

An object of this invention is to control the resistance of a thermistor element by way of its temperature with an electrical means that either supplies heat to or removes heat from the thermistor element.

One feature of this invention resides in thermoelectric junction means in good thermally conductive relation with a thermistor element.

Another feature of this invention involves a thermoelectric junction means associated with a thermistor element and acting as an indirect controller analogous to the heater of an indirectly heated thermistor.

A further feature of the invention lies in a thermoelectric junction means serving jointly as a controller and as the terminals or electrodes of a thermistor element.

Still another feature of this invention resides in the combination of a thermistor means, thermoelectric junction means in good heat transfer relation therewith, and an envelope for enclosing these means in a vacuum or other suitable atmosphere of small heat capacity and low thermal conductivity.

Other and further objects and features of this invention will be understood more clearly and fully from the accompanying description of illustrative embodiments thereof taken in connection with the appended drawing in which.

Figure 1:
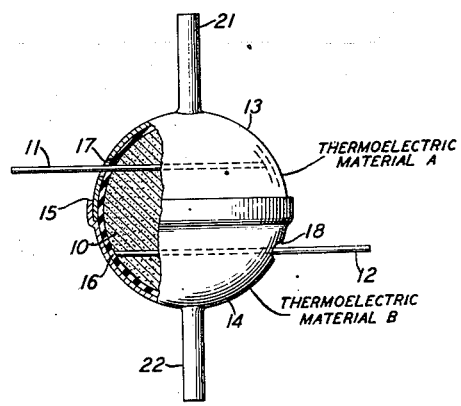
Fig. 1 is an elevational view with a portion sectioned to show internal details of one illustrative form of indirectly controlled thermistor in accordance with this invention.

Referring to Fig. 1, 10 is a body or bead of thermistor material such as boron, one or more of the heat treated oxides of manganese, nickel, cobalt and copper or other suitable material having a relatively high resistance-temperature coefficient. A pair of conductive leads 11 and 12 may be embedded in spaced relation in the body 10 for making electrical connection thereto. The thermoelectric means for controlling the temperature of the thermistor element 10 comprises in this particular modification, two cup-like members 13 and 14 of different metallic materials respectively. The members 13 and 14 are joined together at 15 to form a thermoelectric junction. The body 10 is electrically insulated from the members 13 and 14 by a thin layer 16 of insulating material. The members 13 and 14 are provided respectively with orifices 17 and 18 which are of greater diameter than that of the leads 11 and 12, which pass therethrough, in order to afford an insulating space between the leads and members.

The thermal conductance between the body 10 and the members 13 and 14 should be good. The insulating material 16 therefore should have a thermal conductivity as high as possible consistent with a sufficient degree of electrical insulation. Although the thermal conductivity of layer 16 may be lower than is desired due to its necessarily relatively high electrical resistivity, the thermal conductance therethrough may be kept relatively high by making the layer very thin.

Some suitable insulating materials are glass, a mixture of aluminum oxide and a glass-like flux or for devices for which the operating temperature is sufficiently low, some of the various synthetic resins, waxes, etc.

The different thermoelectric materials, which are designated on the drawing as A and B, may comprise any of a plurality of combinations of metals and metal alloys which will produce a sufficient thermoelectric effect. Some exemplary combinations are copper and iron, brass and iron, platinum and a platinum-rhodium alloy or platinum and a platinum-iridium alloy.

The members 13 and 14 are provided respectively with terminals 21 and 22, which may be wires or rods secured to said members or which may be formed integral therewith.

Obviously, an indirectly operated thermistor having a thermoelectric junction controller may take other forms than the one illustrated in Fig. 1. For example, the thermojunction might be embedded within the insulating material and insulated therefrom or might take various other shapes than the mating cups of the illustrated embodiment.

One way of using the indirectly controlled thermistors, for example, the device of Fig. 1, is to connect a controlling circuit to the thermojunction by way of terminals 21 and 22 and a circuit to be controlled, to the resistor body 10 by means of leads 11 and 12.

Figure 2:
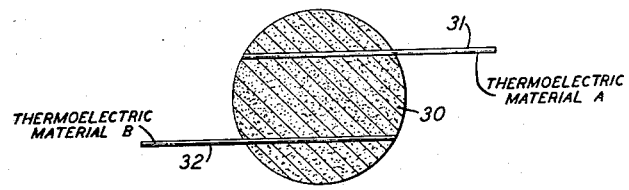
Fig. 2 is a sectional view of an illustrative form of a directly controlled thermistor, also in accordance with the invention.

The device illustrated in Fig. 2 is similar to a simple bead thermistor having conductive leads embedded therein; and comprises a body or bead 30 with leads or terminals 31 and 32. This device differs from an ordinary bead thermistor in the material of the conductive leads 31 and 32, which is different for each lead. These materials, which for purpose of explanation are designated as thermoelectric materials A and B, respectively, may comprise various combinations of metals or metal alloys like the materials A and B of the device shown in Fig. 1. In this case due to the differences between the respective lead materials the thermoelectric effect is caused by the same current that flows through the thermistor body 30. Depending upon which way the current is flowing the thermojunction effect operates to either heat or cool the thermistor and thereby controls its resistance.

Various modifications of the directly controlled thermistor having thermoelectric junction control means may be devised. For example, more than two embedded leads may be used. If four leads are used they might be connected in parallel pairs so that the external circuit connections would be the same as for a two-lead device, but the current distribution within the thermistor body would be different. Different combinations of thermojunction materials might be used for different pairs so that the heating or cooling would be different in different parts of the thermistor body. A three-lead thermistor might have two leads of respectively different materials and a third lead of the same material as one of them so that the thermoelectric effect would not occur between the leads of like material. Such a device might be considered to be more in the nature of an indirectly operated thermistor with the thermoelectric junction embedded in the bead.

Figure 3:
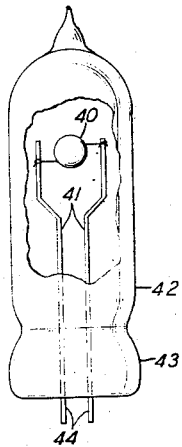
Fig. 3 is a view in elevation of a thermistor in accordance with this invention and enclosed in an envelope.

As is shown in Fig. 3, a thermistor unit 40 having thermoelectric control means in accordance with this invention may be mounted by means of leads 41 in an envelope 42. The envelope may be a glass tube with a base 43 containing terminals 44, connected to the leads 41. This envelope may be evacuated to a fairly low pressure or may be filled with a suitable gas such as helium. Although Fig. 3 shows two supporting leads 41 and two terminals 44 such as would be used for a directly controlled thermistor like the one in Fig. 2, obviously additional leads and terminals could be provided for an indirectly controlled device such as shown in Fig. 1.

A thermistor with thermoelectric control means when enclosed in an evacuated or gas-filled envelope has an advantage over similarly enclosed thermistors of the ohmic heater type in that both the sensitivity and speed are increased. As previously indicated a thermistor controlled by ohmic heating can be given greater sensitivity at the expense of speed by reduction in the heat capacity and thermal conductivity of the ambient atmosphere or surrounding material; or increased speed may be obtained with lower sensitivity by increase in these factors. From the viewpoint of applied power the cooling part of the cycle is passive, i. e., the power input is reduced and the device allowed to cool. On the other hand, in a thermistor controlled by a thermoelectric junction, the cooling as well as the heating is an active step, power being applied to obtain cooling. It is therefore unnecessary to provide surrounding conditions particularly favorable to cooling as in the case of passive cooling. Consequently, both high sensitivity and high speed can be obtained by reducing the heat capacity and thermal conductivity of the means surrounding the thermistor, e. g., enclosing in an evacuated envelope.

Although the invention has been disclosed in terms of particular illustrative embodiments thereof, it will be understood that it is not limited thereby, but by the scope of the appended claims only.

What is claimed is:

1. A thermally controlled resistor comprising a body of a material having a relatively high temperature coefficient of resistance, terminal means secured to said body, and thermoelectric junction means in good thermally conductive relation to said body but electrically insulated from said body and said terminal means.

2. A resistor device comprising a body of high resistance-temperature coefficient material, spaced conductive leads embedded in said body, two members of different metallic material cooperating to enclose said body, said members joined to form a thermoelectric junction, said members being insulated from said leads, insulating means separating said members from said body, and means for making electrical connection to each of said members.

3. A resistor device comprising a body of resistance material, conductive leads secured to said body in spaced relation, a thin layer of insulating material covering said body, a shell over said insulating layer and in intimate contact therewith, said shell being insulated from said leads and comprising two portions of different metallic materials joined in a thermoelectric junction, and means for making electrical connection to each of said portions.

4. A resistor device comprising a body of high resistance-temperature coefficient material, terminal electrodes embedded in said body in spaced relation, two metallic members in good thermally conductive relation with said body, said members being of different material and joined to form a thermoelectric junction with respect to electric current which may pass from one member to the other.

5. A resistor device comprising a body of material having a high resistance-temperature coefficient, means for making electrical connection to said body, thermoelectric junction means in good heat transfer relation with said body but electrically insulated therefrom, and means for making electrical connection to said thermoelectric junction means.

6. A thermally controlled resistor device comprising a body of material having a high resistance-temperature coefficient, thermoelectric junction means in good heat transfer relation with said body, and an envelope enclosing said body and means in an atmosphere of small thermal capacity and low thermal conductivity.

LEON T. WILSON.